United States Patent

Chamness

[15] 3,649,334

[45] Mar. 14, 1972

[54] NONBLOCKING ADHERENT CELLULOSE FILM

[72] Inventor: James Thomas Chamness, Richmond, Va.

[73] Assignee: E. I. du Pont de Nemours and Company, Wilmington, Del.

[22] Filed: Aug. 20, 1968

[21] Appl. No.: 753,903

[52] U.S. Cl. ............................117/62.2, 117/56, 117/76 A, 117/122 H
[51] Int. Cl. ...................................................B44d 1/44
[58] Field of Search.................117/145, 155, 161, 76, 56, 117/62.2, 76 A, 122 H

[56] References Cited

UNITED STATES PATENTS

| | | | |
|---|---|---|---|
| 3,009,831 | 11/1961 | Wilfinger | 117/144 |
| 3,297,476 | 1/1967 | Kane | 117/132 |
| 3,507,685 | 4/1970 | Banerjee | 117/76 |
| 2,933,416 | 4/1960 | Haakh et al. | 117/145 X |
| 3,011,910 | 12/1961 | Hagan et al. | 117/145 X |
| 3,122,447 | 2/1964 | Sexsmith | 117/145 X |
| 3,196,040 | 7/1965 | Kane | 117/76 |
| 3,230,135 | 1/1966 | Hurst | 117/145 X |
| 3,375,215 | 3/1968 | Kane | 117/145 X |
| 3,423,350 | 1/1969 | Ryan | 117/76 X |
| 3,442,697 | 5/1969 | Kane | 117/76 X |

Primary Examiner—William D. Martin
Assistant Examiner—Lusignan
Attorney—Donald W. Huntley

[57] ABSTRACT

A cellulosic film impregnated with a cationic amide formaldehyde resin such as melamine formaldehyde or urea formaldehyde and a polyalkyleneimine to prevent blocking of the cellulosic material when rolled on a mill roll and improve the adhesive qualities of the cellulosic material to various coating compositions such as vinylidene chloride polymers or polyethylene.

7 Claims, No Drawings

NONBLOCKING ADHERENT CELLULOSE FILM

BACKGROUND OF THE INVENTION

In the preparation of regenerated cellulose films for specialized uses, it is often necessary to coat the film with various compositions to modify its surface characteristics. For example, coatings of nitrocellulose compositions, ethylene polymers and vinylidene chloride copolymers are often used to make the cellulose film impermeable to water, air, and grease to improve the film's utility for packaging various types of meat and produce.

To render the film adherable to these coatings, polyethylenimine is often used to treat the regenerated cellulose web during the course of production. While such treatment renders the film satisfactorily adherent, the treated film shows a strong tendency to block when rolled up on a mill roll. Such behavior, of course, greatly interferes with the subsequent processing of the film.

Previously, attempts have been made to circumvent the blocking problem in various ways. Alkylated polyalkylenimines have been used as adhesion-promoting agents instead of the unmodified polyalkylenimines, but the greater cost of these compounds make their use impractical in large-scale commercial production. Surfactants have also been used in conjunction with polyalkylenimines to reduce blocking, but the adhesion of the resulting film is somewhat impaired under specialized conditions of temperature and humidity.

SUMMARY OF THE INVENTION

The instant invention provides cellulosic film which is nonblocking yet adherent to subsequently applied coatings. Specifically, the instant invention provides a cellulosic film comprising about from 0.01 to 1.0 percent by weight of the film of a cationic amide-formaldehyde selected from urea-formaldehyde and malamine-formaldehyde resins and about from 0.01 to 0.06 percent polyalkylenimine. The instant invention further provides a process for the preparation of these films which comprises passing a cellulose sheet, while in a solvent-wet state, consecutively through aqueous baths of the amide-formaldehyde resin and the polyalkylenimine.

DESCRIPTION OF THE PREFERRED EMBODIMENTS

The cationic amide-formaldehyde resin used in the instant invention can be selected from urea-formaldehyde or melamine-formaldehyde resins. Urea-formaldehyde resins which can be used in the instant invention are described in detail in U.S.P. 2,533,557 and U.S.P. 2,546,575, which are hereby incorporated by reference. Melamine-formaldehyde resins which can be used in the instant invention are described in U.S.P. 2,796,362, which is also hereby incorporated by reference.

The quantity of resin incorporated into the cellulose film should comprise about from 0.01 to 1.0 percent by weight of the finished film. Amounts less than this range will result in blocking of the film. While amounts in excess of 1.0 percent can be used, this will increase the cost of the film without any material improvement in the blocking characteristics.

The polyalkylenimines which can be used in the instant invention include those derived from the homopolymerization of one or copolymerization of two or more of the lower 1,2-alkylenimines (aziridines) wherein the alkylene radical contains from two to eight carbon atoms. Because of the availability and relatively low cost, polyethylenimine and polypropylenimine are particularly preferred; and in the treatment of regenerated cellulose film it has been found that polyethylenimine having a viscosity within the range of about 2.2 to about 2.8 centistokes as measured at 1 percent concentration in aqueous solution at 100° F., is particularly effective. The polyalkylenimines derived from 1,3-alkylenimines (azetidines) can also be employed since they possess chemical and physical properties similar to the polymers derived from the 1,2-imines.

It is further preferred that the polyalkylenimine used in this invention have a molecular weight within the range of from about 30,000 to about 500,000, since such materials are nontoxic, and can be conveniently handled and stored without gelation in the form of concentrated solutions. It has been found that the qualities of nonblocking and good adhesion respectively deteriorate when the percentage of polyalkylenimine in the cellulose film is above 0.06 percent or below 0.01 percent.

The particular method of application of the additives of the instant invention is not critical, so long as they are applied uniformly to the entire surface of the cellulose film. The amide-formaldehyde resins and the polyalkylenimines can be applied directly to the cellulose film, but are more conveniently applied when dispersed or dissolved in water or an organic solvent such as a ketone, e.g., methyl-ethyl ketone, methyl-isopropyl ketone, and acetone, or a lower alkanol, e.g., those having from one–four carbon atoms. Generally, aqueous concentrations of about from 0.03 to 2.0 percent of each of the additives is sufficient to apply the required quantities of each additive to the cellulose film. In the preparation of regenerated cellulose films, however, the gel state web is often passed through aqueous solutions of plasticizers or softening agents such as glycerol, which solutions are maintained at a pH of about from 6.5 to 7.5. The additives of the instant invention can be very conveniently incorporated into the cellulose web by simply adding them to the softener bath. It has been found especially desirable to consecutively pass the cellulose web through aqueous solutions of the cationic amide formaldehyde resin and then through an aqueous solution containing both the polyalkylenimine and the softening agent. This preferred sequence of application is found to result in exceptionally good adherence combined with good nonblocking characteristics. After application of the additives of the instant invention, the film is dried by the usual methods to a moisture content of less than 10 percent.

Application of the specified quantities of resin and polyalkylenimine results in a cellulose film which is nonblocking and is readily adherable to coatings such as nitrocellulose, polyethylene and vinylidene chloride copolymer when applied by conventional techniques. The good adherence obtained is surprising in light of the remarkably low quantities of polyalkylenimine used. The adhesion of these coatings to the cellulose is retained even under conditions of high humidity, making the films suitable for packaging of a wide variety of fresh produce.

Although the instant invention is described herein primarily with respect to regenerated cellulose films, it can be applied effectively to other cellulosic films such as paper and films of etherified and esterified cellulose derivatives.

The instant invention is further illustrated by the following examples, in which parts and percentages are by weight.

EXAMPLES 1–4—REGENERATED CELLULOSE FILM COATED WITH VINYLIDENE CHLORIDE COPOLYMER

A melamine-formaldehyde resin is made by bringing into contact 252 parts of melamine (2 moles), 1,620 parts of 37 percent formalin (20 moles) and 2 parts of 20 percent sodium hydroxide solution in a reaction vessel fitted with a stirrer. This mixture is stirred and heated at 75° C. for 30 minutes and then cooled to 65° C. after which 120 parts of 3,3′-iminobispropylamine (0.92 mole) and 90 parts of 37.5 percent hydrochloric acid are added. An exothermic reaction takes place and the mixture is held at 70° C. by cooling for about 20 minutes. When the viscosity reaches 1 by the Gardner-Holdt method, 50 parts of sodium hydroxide are added followed by 1,296 parts of 37 percent formalin. The resulting solution is water clear and has a solids content of about 27 percent.

A regenerated cellulose film is treated by drawing it first through a bath comprising a 0.1 percent aqueous solution of the melamine-formaldehyde resin described above and thereafter through an 11 percent solution of glycerine in water containing varying amounts of polyethylenimine. Excess solution is scraped from the film and the film is subsequently dried. Thereafter a coating of a vinylidene chloride copolymer is applied, prepared as described in Example 5 of U.S.P. 3,375,215.

The adhesion of the film, as indicated by its heat seal strength, is measured by cutting a piece of the coated film 4 inches by 10 inches with the grain running in the long or machine direction into two pieces 4 inches by 5 inches each. The two pieces are superimposed so that opposite surfaces are in contact and are then sealed together at each end at right angles to the grain with a three-fourths inch wide sealing bar heated to 140° C. at 35 percent relative humidity and a pressure of 5 p.s.i. for one-fourth second. The sealed sheets are then cut in half at right angles to the grain. From out of the centers of each of the two resulting pieces, two 1½ inches wide strips parallel to the grain are cut. The resulting four sets of strips are tested by opening at the free ends, placing them in a Suter testing machine and pulling them apart. The highest force in grams required to pull the strips apart is taken as a measure of the heat seal bond strength.

TABLE I

| Example | PEI Bath Concentration—% | Heat Seal Strength (Grams) |
|---|---|---|
| 1 | .12 | 380 |
| 2 | 0.09 | 360 |
| 3 | 0.06 | 370 |
| 4 | 0.03 | 370 |

Concentration of the melamine-formaldehyde resin in the base film is in the order of 0.12 percent and that of the polyethylenimine ranges from 0.01 percent for Example 4 to about 0.06 percent for Example 1. Even at this very low concentration of adhesion agent in the film, strong heat seal bonds are obtained. Good adhesion of the coating is retained under conditions of high humidity.

"Anchorage," the adhesion of the coating to the base film when in direct contact with water, is measured by suspending samples of the coating base film in water at 45° C. for 16 hours and grading as follows:
Grade 1—No blisters
Grade 2—Few blisters
Grade 3—Decided blistering
Grade 4—Coating sloughs-off at blistered or unblistered portions Grade 1 anchorage values are obtained for all films in Examples 1-4. No difficulty with blocking of the base film in the mill roll is experienced.

EXAMPLE 5—COMPARATIVE EXAMPLE

Example 1 is repeated except that the melamine-formaldehyde resin is omitted and the quantity of polyethylenimine doubled to obtain satisfactory adhesion. The resulting film, prior to being coated with the vinylidene chloride copolymer, exhibits severe blocking in the mill roll under ordinary conditions and in moist atmospheres.

EXAMPLE 6—COMPARATIVE EXAMPLE

Example 1 is repeated except that the polyethylenimine is omitted. The adhesion of the resulting coated film is inadequate for exposure to ordinary or moist atmospheres.

EXAMPLES 7-11

In Examples 7-11, the procedure of Example 1 is repeated, except that the treated regenerated cellulose film is melt coated with 2 mil thick layer of polyethylene instead of the vinylidene chloride copolymer. The adhesion of the resulting coated films is indicated by their Cold Peel Strength. This is measured by attempting to lift the coating from the base film of a test sample with a sharp edged instrument such as a knife. If the coating cannot be lifted without rupture of the coating itself, the bond is labeled "No peel" (NP). If the coating can be lifted, a 1 inch wide strip of adhesive tape is attached to the loosened strip which is then pulled off at an angle of 180°. The force required to peel the strip of coating is the measure of Cold Peel Strength. Prior to testing, the coated film test samples are conditioned for 24 hours at 75° F. and 35 percent relative humidity.

These examples are summarized in Table II.

TABLE II

| Example | PEI Concentrated—% | Cold Peel Strength (Grams) |
|---|---|---|
| 7 | 0.12 | 600 |
| 8 | 0.09 | 600 |
| 9 | 0.06 | 600 |
| 10 | 0.03 | 600 |
| 11 | 0 | 130 |

Good adhesion, as indicated by heat seal values, and Grade 1 anchorage values are obtained on films exposed to high humidity conditions. As indicated by the above data, the cold peel strength is significantly improved by the presence of polyethylenimine.

I claim:
1. A film of regenerated cellulose impregnated with about from 0.01 to 1.0 percent by weight of the film of cationic amide formaldehyde resin selected from melamine formaldehyde resin and urea formaldehyde resin, and about from 0.01 to 0.06 percent polyalkylenimine.
2. A film of claim 1 wherein the amide formaldehyde resin is a melamine formaldehyde.
3. A film of claim 1 wherein the amide formaldehyde resin is urea formaldehyde.
4. A film of claim 1 wherein the polyalkylenimine is polyethylenimine.
5. A film of claim 1 wherein the polyalkylenimine is polypropylenimine.
6. A process for the preparation of regenerated cellulosic film which comprises consecutively passing the film, in a solvent-wet state, first through
   a. an aqueous solution of about from 0.03 to 2.0 percent of an amine formaldehyde selected from melamine formaldehyde resins and urea formaldehyde resins, and thereafter through
   b. an aqueous solution of about from 0.03 to 2.0 percent polyalkylenimine, and drying the impregnated sheet.
7. A process of claim 6 wherein solution (b) additionally includes up to about 11 percent plasticizer.

* * * * *